(12) United States Patent
Bird et al.

(10) Patent No.: US 11,818,292 B1
(45) Date of Patent: Nov. 14, 2023

(54) MULTIMODE SERVICE COMMUNICATION CONFIGURATION

(71) Applicant: West Corporation, Omaha, NE (US)

(72) Inventors: Andrew Bird, Elkhorn, NE (US); Jil M. Fisher, Omaha, NE (US); David Stirk, North Bondi (AU); Craig A. Webster, Elkhorn, NE (US)

(73) Assignee: INTRADO CORPORATION, Omaha, NE (US)

( * ) Notice: Subject to any disclaimer, the term of this patent is extended or adjusted under 35 U.S.C. 154(b) by 81 days.

(21) Appl. No.: 15/430,671

(22) Filed: Feb. 13, 2017

(51) Int. Cl.
| | |
|---|---|
| *H04M 3/00* | (2006.01) |
| *H04M 5/00* | (2006.01) |
| *H04L 12/66* | (2006.01) |
| *H04M 3/51* | (2006.01) |
| *H04M 3/42* | (2006.01) |
| *G06Q 30/02* | (2023.01) |
| *H04M 1/7243* | (2021.01) |
| *G06Q 30/016* | (2023.01) |

(52) U.S. Cl.
CPC ...... *H04M 3/5191* (2013.01); *G06Q 30/0281* (2013.01); *H04M 1/7243* (2021.01); *H04M 3/42068* (2013.01); *H04M 3/5166* (2013.01); *G06Q 30/016* (2013.01); *H04M 2203/351* (2013.01); *H04M 2203/6081* (2013.01)

(58) Field of Classification Search
CPC .. H04M 3/5183; H04M 3/5191; H04M 3/523; H04M 3/5175; H04M 3/51; H04M 3/5233; H04M 3/5232; H04M 3/5125; H04M 3/5231; H04M 2201/38; H04M 3/42221; H04M 1/72536; H04M 3/42382; H04M 2201/42; H04M 3/42068; H04L 65/1023; H04L 65/4084; H04L 67/02; H04L 51/14; H04L 65/00; H04L 51/00; H04L 51/046

USPC ............ 379/265.09, 265.01, 265.05, 265.11, 379/266.01, 265.02, 265.06, 88.13, 379/265.12, 265.13, 265.14; 370/351, 370/352, 353, 354

See application file for complete search history.

(56) References Cited

U.S. PATENT DOCUMENTS

| | | | |
|---|---|---|---|
| 7,409,369 B1 * | 8/2008 | Homuth .............. | G06Q 40/025 705/39 |
| 8,824,664 B1 * | 9/2014 | Ristock ................ | H04L 47/286 379/266.01 |
| 9,955,021 B1 * | 4/2018 | Liu ..................... | H04M 7/0084 |
| 10,572,842 B1 * | 2/2020 | To ......................... | G06Q 30/00 |
| 2003/0013438 A1 * | 1/2003 | Darby .................. | G06Q 30/02 455/419 |

(Continued)

*Primary Examiner* — Kharye Pope

(57) ABSTRACT

Processing customer communications may include receiving a communication from a customer device via a first communication medium, designating the communication as an active communication, receiving a display selection to receive content during the active communication status and designating a current customer status, parsing the current customer status to identify a current condition, assigning an agent to the customer record based on the current condition, retrieving at least one pre-recorded content file associated with the assigned agent and the current customer condition, and forwarding the pre-recorded content file to the customer device via a second communication medium different from the first communication medium.

20 Claims, 12 Drawing Sheets

(56) References Cited

U.S. PATENT DOCUMENTS

| | | | | |
|---|---|---|---|---|
| 2003/0120591 | A1* | 6/2003 | Birkhead | G06Q 20/10 705/39 |
| 2004/0116785 | A1* | 6/2004 | Bulat | A61B 5/0002 600/300 |
| 2004/0125938 | A1* | 7/2004 | Turcan | H04M 3/42323 379/265.02 |
| 2004/0148194 | A1* | 7/2004 | Wellons | G06Q 10/10 705/2 |
| 2005/0102160 | A1* | 5/2005 | Brown | G16H 50/20 705/2 |
| 2005/0286492 | A1* | 12/2005 | Perlmutter | H04W 4/12 370/352 |
| 2007/0093255 | A1* | 4/2007 | Nurminen | H04M 7/003 455/455 |
| 2007/0211881 | A1* | 9/2007 | Parker-Stephen | H04M 3/5133 379/265.01 |
| 2009/0204407 | A1* | 8/2009 | Shields | H04M 3/4933 704/270.1 |
| 2009/0262919 | A1* | 10/2009 | Schoenberg | G06Q 40/08 379/221.02 |
| 2010/0113072 | A1* | 5/2010 | Gibson | G06Q 20/32 455/466 |
| 2010/0133339 | A1* | 6/2010 | Gibson | G06Q 20/3276 235/382 |
| 2010/0205539 | A1* | 8/2010 | Gestsson | G06Q 10/107 715/752 |
| 2010/0310059 | A1* | 12/2010 | Davis | H04M 3/5166 379/88.18 |
| 2012/0099720 | A1* | 4/2012 | Soundar | H04M 3/5158 379/265.02 |
| 2012/0257002 | A1* | 10/2012 | Stocker | H04M 7/0024 348/14.08 |
| 2013/0301820 | A1* | 11/2013 | Williams | H04M 3/2281 379/201.01 |
| 2014/0006158 | A1* | 1/2014 | Cooper | G06Q 30/0258 705/14.56 |
| 2014/0143139 | A1* | 5/2014 | Koplovitz | G06Q 20/3221 705/39 |
| 2015/0181039 | A1* | 6/2015 | Erhart | H04M 3/5191 379/265.09 |
| 2015/0312411 | A1* | 10/2015 | Miller, II | H04M 3/4935 379/88.01 |
| 2015/0363787 | A1* | 12/2015 | Vasquez | G06Q 30/016 705/304 |
| 2015/0381674 | A1* | 12/2015 | Klemm | H04M 3/5166 709/203 |
| 2016/0065634 | A1* | 3/2016 | Pati | H04L 67/22 709/219 |
| 2016/0086029 | A1* | 3/2016 | Dubuque | G06K 9/00979 382/159 |
| 2017/0243013 | A1* | 8/2017 | Herlocher | G06Q 20/3223 |
| 2018/0084111 | A1* | 3/2018 | Pirat | H04M 3/5183 |
| 2018/0108070 | A1* | 4/2018 | Thompson | G06Q 30/0633 |
| 2018/0324238 | A1* | 11/2018 | Melenboim | H04N 21/47217 |

* cited by examiner

MULTIMODE SERVICE COMMUNICATION CONFIGURATION

CROSS-REFERENCE TO RELATED APPLICATION

This application is related to co-pending application Nos. PAT-269B and PAT-269C, the entire contents of which are hereby incorporated by reference.

TECHNICAL FIELD OF THE APPLICATION

This application relates to a multimode application for receiving and handling information and more particularly to providing various modes of communication during a customer interaction session.

BACKGROUND OF THE APPLICATION

Conventionally, when a customer calls a customer service representative, agent support system, and the like for various reasons, the call agent or agent phone support system has a combination of a phone and computer database interface to assist the caller by identifying the caller and reference account information to assist the caller.

As the types of customer subscriptions continues to evolve, the types of call agent services and call center services continues to evolve as well. For instance, a user calling a support center is often utilizing a smartphone with applications aimed at providing such support. Also, emails, short message service (SMS) messages and live calls are all available during a communication session. However, most services are limited to only one service communication medium at a time.

FIG. 1 illustrates a conventional prior art communication network configuration 100. Referring to FIG. 1, the consumer 102 may utilize a communication device 110, such as a phone, mobile phone, smartphone, Internet enabled computing device, tablet computing device, etc., to initiate a communication to a customer call center over a network or PSTN 130. The service provider 120 may be located at a remote service site managed by call database servers 124. The service agent 122 typically resides at a workplace location and answers a phone 123 as the calls and requests are received.

However, this approach does not enable multiple modes of communication to alleviate customer needs and to satisfy customer inquiries and concerns and to provide a far better customer experience by delivering requested and prescient information.

SUMMARY OF THE APPLICATION

Example embodiments of the present application provide at least a method that includes at least one of receiving a communication from a customer device via a first communication medium, retrieving a customer record associated with the customer device, designating the communication as an active status, identifying an initial communication purpose based on at least one selection received from the customer device during the communication, and updating the customer record responsive to identifying the initial communication purpose by changing a status of the customer record to permit additional communication options.

Another example embodiment includes an apparatus that provides a receiver configured to receive a communication from a customer device via a first communication medium, a processor configured to retrieve a customer record associated with the customer device, designate the communication as an active status, identify an initial communication purpose based on at least one selection received from the customer device during the communication, and update the customer record responsive to identification of the initial communication purpose by changing a status of the customer record to permit additional communication options.

Yet another example embodiment includes a non-transitory computer readable storage medium configured to store instructions that when executed causes a processor to perform at least one of receiving a communication from a customer device via a first communication medium, retrieving a customer record associated with the customer device, designating the communication as an active status, identifying an initial communication purpose based on at least one selection received from the customer device during the communication, and updating the customer record responsive to identifying the initial communication purpose by changing a status of the customer record to permit additional communication options.

Another example embodiment includes a method that includes at least one of receiving a communication from a customer device via a first communication medium, retrieving a customer record associated with the customer device, designating the communication as an active status, transmitting an option display link to the customer device via a second communication medium different from the first communication medium, receiving at least one selection from the customer device and identifying a purpose of the communication based on the at least one selection, updating the customer record to indicate multiple modes of communication compliance and to permit additional communication messages to be forwarded to the customer device; and elevating a status of the customer record based on the multiple modes of communication compliance.

Still yet a further example embodiment includes an apparatus that includes a receiver configured to receive a communication from a customer device via a first communication medium, a processor configured to retrieve a customer record associated with the customer device, designate the communication as an active status, a transmitter configured to transmit an option display link to the customer device via a second communication medium different from the first communication medium, and the receiver is also configured to receive at least one selection from the customer device and identifying a purpose of the communication based on the at least one selection, and wherein the processor is also configured to update the customer record to indicate multiple modes of communication compliance and to permit additional communication messages to be forwarded to the customer device, and elevate a status of the customer record based on the multiple modes of communication compliance.

Yet still another example embodiment may include a non-transitory computer readable storage medium configured to store instructions that when executed causes a processor to perform at least one of receiving a communication from a customer device via a first communication medium, retrieving a customer record associated with the customer device, designating the communication as an active status, transmitting an option display link to the customer device via a second communication medium different from the first communication medium, receiving at least one selection from the customer device and identifying a purpose of the communication based on the at least one selection, updating the customer record to indicate multiple modes of communication compliance and to permit additional communication messages to be forwarded to the customer device, and elevating a status of the customer record based on the multiple modes of communication compliance.

Still another example embodiment includes a method that includes at least one of receiving a communication from a customer device via a first communication medium, designating the communication as an active communication, receiving a display selection to receive content during the active communication status and designating a current customer status, parsing the current customer status to identify a current condition, assigning an agent to the customer record based on the current condition, retrieving at least one pre-recorded content file associated with the assigned agent and the current customer condition, and forwarding the pre-recorded content file to the customer device via a second communication medium different from the first communication medium.

Yet still a further example embodiment includes an apparatus that includes a receiver configured to receive a communication from a customer device via a first communication medium, a processor configured to designate the communication as an active communication, and the receiver is further configured to receive a display selection to receive content during the active communication status, and the processor is further configured to designate a current customer status, parse the current customer status to identify a current condition, assign an agent to the customer record based on the current condition, retrieve at least one pre-recorded content file associated with the assigned agent and the current customer condition, and a transmitter configured to transmit the pre-recorded content file to the customer device via a second communication medium different from the first communication medium.

And still another example embodiment includes a non-transitory computer readable storage medium configured to store instructions that when executed causes a processor to perform receiving a communication from a customer device via a first communication medium, designating the communication as an active communication, receiving a display selection to receive content during the active communication status and designating a current customer status, parsing the current customer status to identify a current condition, assigning an agent to the customer record based on the current condition, retrieving at least one pre-recorded content file associated with the assigned agent and the current customer condition, and forwarding the pre-recorded content file to the customer device via a second communication medium different from the first communication medium.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

In one example the interaction between a user device and a communication processing server may begin with an inbound voice call/message in this example. It could also be started by an outbound call, an inbound SMS or an outbound SMS and still include a visual voice session. The application may prompt the caller to switch to visual interaction, and then information can be collected from a data repository or web pages. You can select any of the street addresses and enter any email address or just use the prefilled email address. The caller is serviced automatically. In one example, a message is sent via SMS with information and/or a link to information that the user can select.

Figure 1:
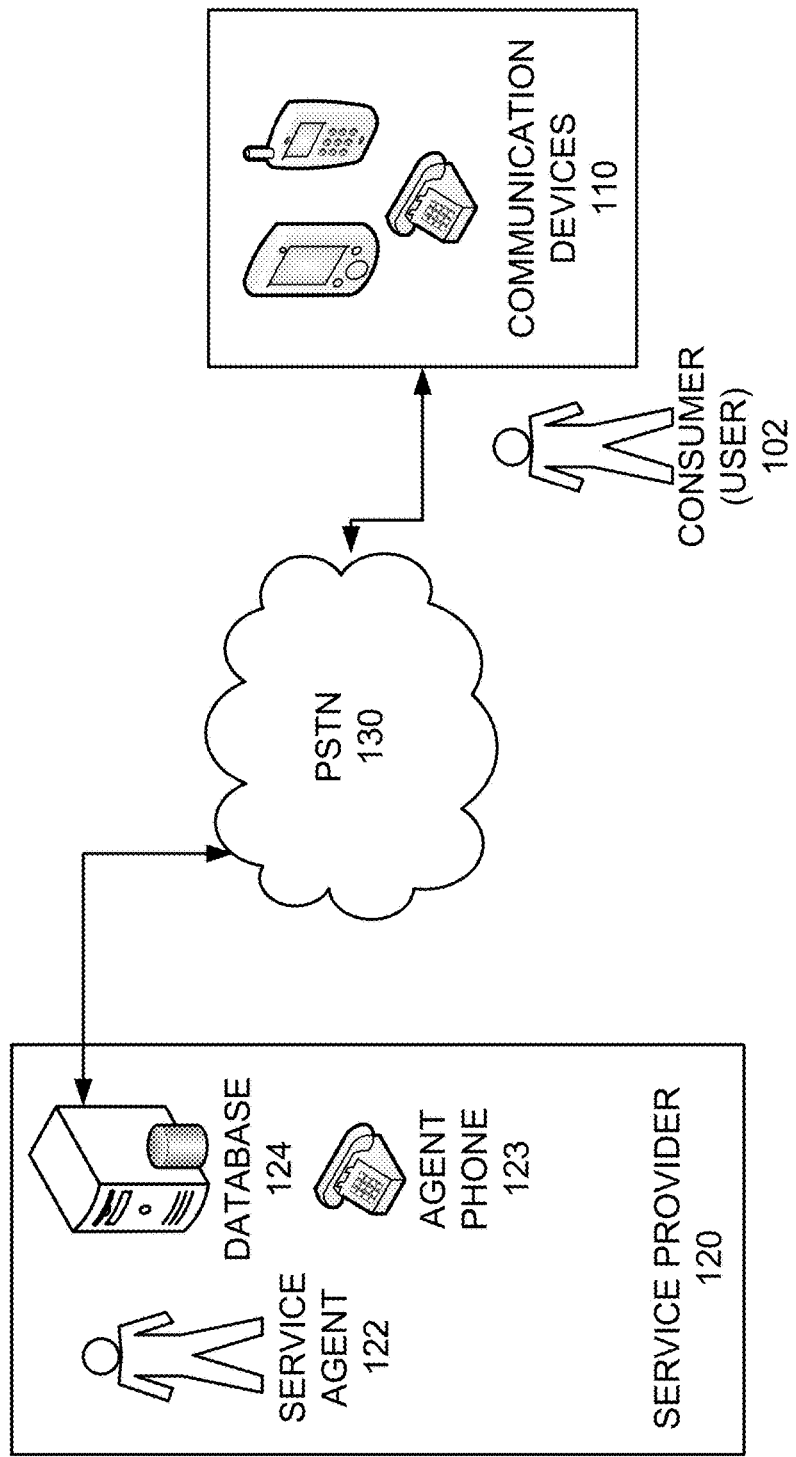
FIG. 1 illustrates an example prior art communication network for customer request processing.
Figure 2:
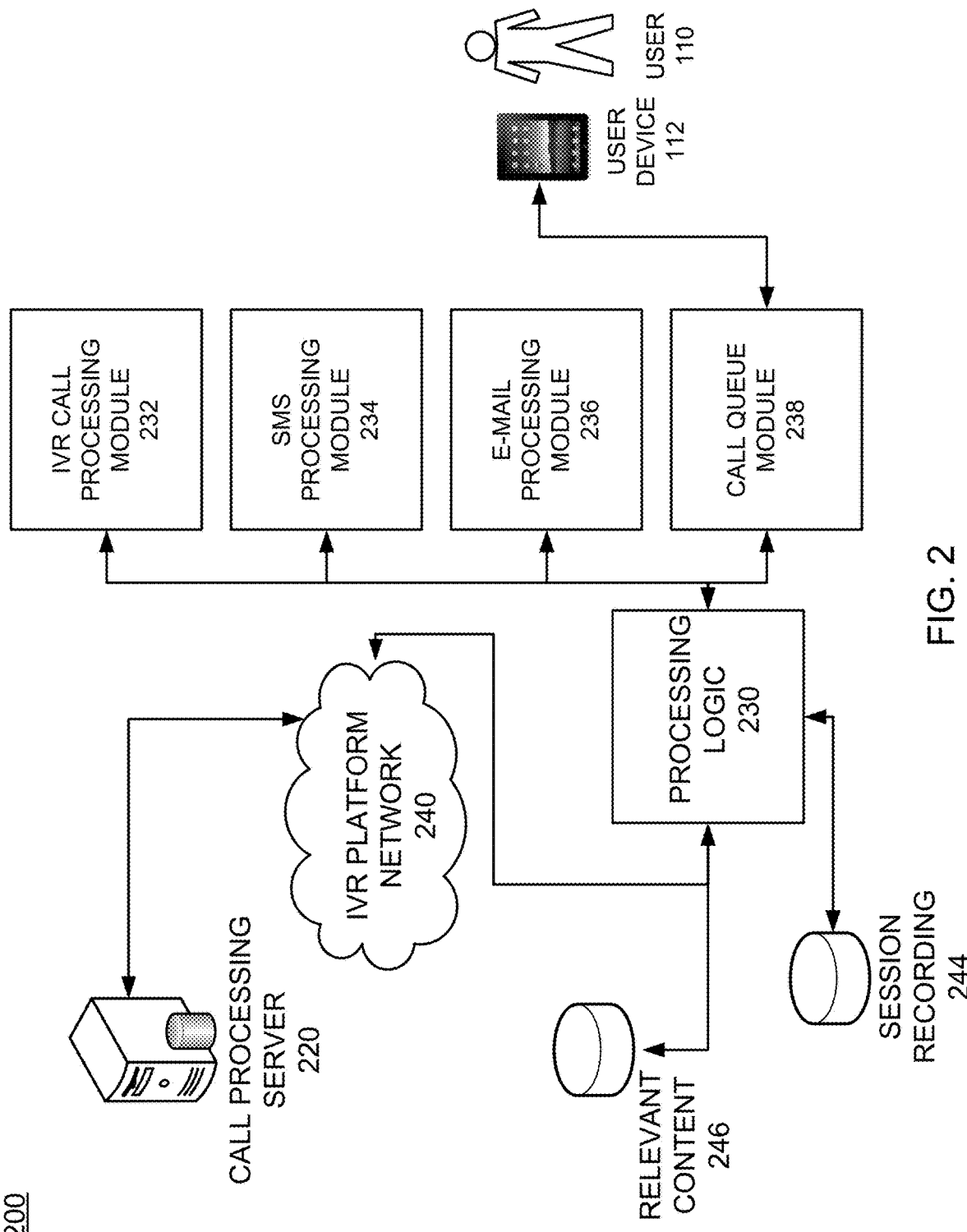
FIG. 2 illustrates an example multi-mode communication logic diagram and processing logic according to example embodiments of the present application.

FIG. 2 illustrates an example multi-mode communication logic diagram and processing logic according to example embodiments of the present application. Referring to FIG. 2, the network 200 includes a user device 112 operated by a user 110 may be a communication device. The device may be a personal computer, a server, a console, a personal digital assistant (PDA), a cell phone, a tablet computing device, a smartphone or any other suitable computing device, or combination of devices. The user 110 may initiate a communication, such as a message, e-mail or call to a customer support center. For purposes of this disclosure, the examples provided will be based on a medical call center and medical support system, however, those skilled in the art will appreciate that any customer support platform will be appropriate for the example embodiments provided in this disclosure.

In operation, the user device 112 may initiate a call to a customer support center operated by the call processing server 220. The call server 220 may process the call and provide an interactive voice (IVR) processing platform 240 to process callers questions and provide automated caller options over a phone connection. The IVR platform 240 may be a network including multiple processing servers for processing voice recognition and display selection operations to satisfy customer needs. In this example, the network platform 240 may utilize processing logic 230 to respond and inquire as to the customer's needs, wants, concerns, etc. For a customer seeking medical attention (i.e., live chat, physician appointment, follow-up appointment, prescription refills, test result consultations, etc.), the call may be received and set to an active status with an active status flag, a timer representing an amount of time since the call has been answered, and other indicators which reflect a communication status for a customer/user since the communication was placed. The processing logic may then initiate multiple modes of communication during the call to include a call voice channel as the initial communication channel, a short message service (SMS) communication channel which represents a second communication channel used to send messages to the user device 112 during the active call and an electronic mail communication channel used to send summary and follow-up emails to the user device based on content of the call.

In one specific example, the communication is placed and the user's intent is not known by the system processing logic 230. The call/communication is made active and requires a status update. The call queue module 238, is an optional communication processing module, which may enact a status placement for the received call and establish a queue position identifier based on the user device and the user account associated with the device. The active communication may eventually trigger a SMS message to be sent to the user device 112 via the SMS processing module 234. The IVR call processing module 232 may initiate a voice prompt that asks the user questions and receives and processes the voice of the user during the voice processing segments of the call. The SMS message may be a link to an application, website, etc. The link may be a trigger to launch an application installed on the user device 112. The SMS message may appear on the user device during the active call and the user may select the message and respond to a question, such as "What is your purpose for calling?" The user may respond by saying "I have the flu". The processing logic 230 may then identify the purpose of the response SMS message received from the user or via the voice of the user and parse the information to identify the purpose of the call. The e-mail processing module 236 may also receive and send e-mails including video content, links, textual information, etc.

Once an establish call purpose is identified, the user profile can then be used to identify the user's current physician group or assigned physician. The processing logic can then populate a display of items for user entertainment, education, selling points, time saving efforts, etc. The logic 230 may also retrieve relevant content 246, such as videos, links and display items, studies, physician notes on the identified condition (i.e., flu), user blogs, live chats, videos, drug advertisements, etc., all of which are related to the customer's purpose. The user application on the user device 112 may include a plurality of segments which can be populated with those identified display items related to the context of the user's purpose, which is in this example an ailment. During the display selection operations, a record and log may be created to identify the user's selections, videos watched, the exact locations the user was at when the call matured and stopped the video, etc. A record of all the user's selections and history during the call can then be placed in an e-mail as a summary that the user can identify and relate to at a later time. The content titles may be stored in a session recording content databank 246 and the session information may be stored in a session recording databank 244. It is important to note that the session recording may include audio from the call, however, user selections of the display options, videos, audio, etc., accessed, commercials, studies, papers, blogs, etc., may all be logged for user convenience in returning to any or all of those selections once the call is complete. When the call is answered, the user may setup an appointment, speak to a physician, request information and/or perform any medical advice requests. The relevant content 246 may also include video (pre-recorded and/or live) which could be watched while still does awaiting a transfer of the live and active communication to an agent connected via a cloud network 240 to assist the user. The ongoing active communication does not require a live call. The active session may be monitored and active according to a timer which starts the moment a call, e-mail or SMS message is sent until the user device 112 is connected to a live agent. The content provided to the user device 112 may be provided during the active communication and prior to connecting the user device. This enables the user to receive information while awaiting live communication with an agent.

Figure 3:
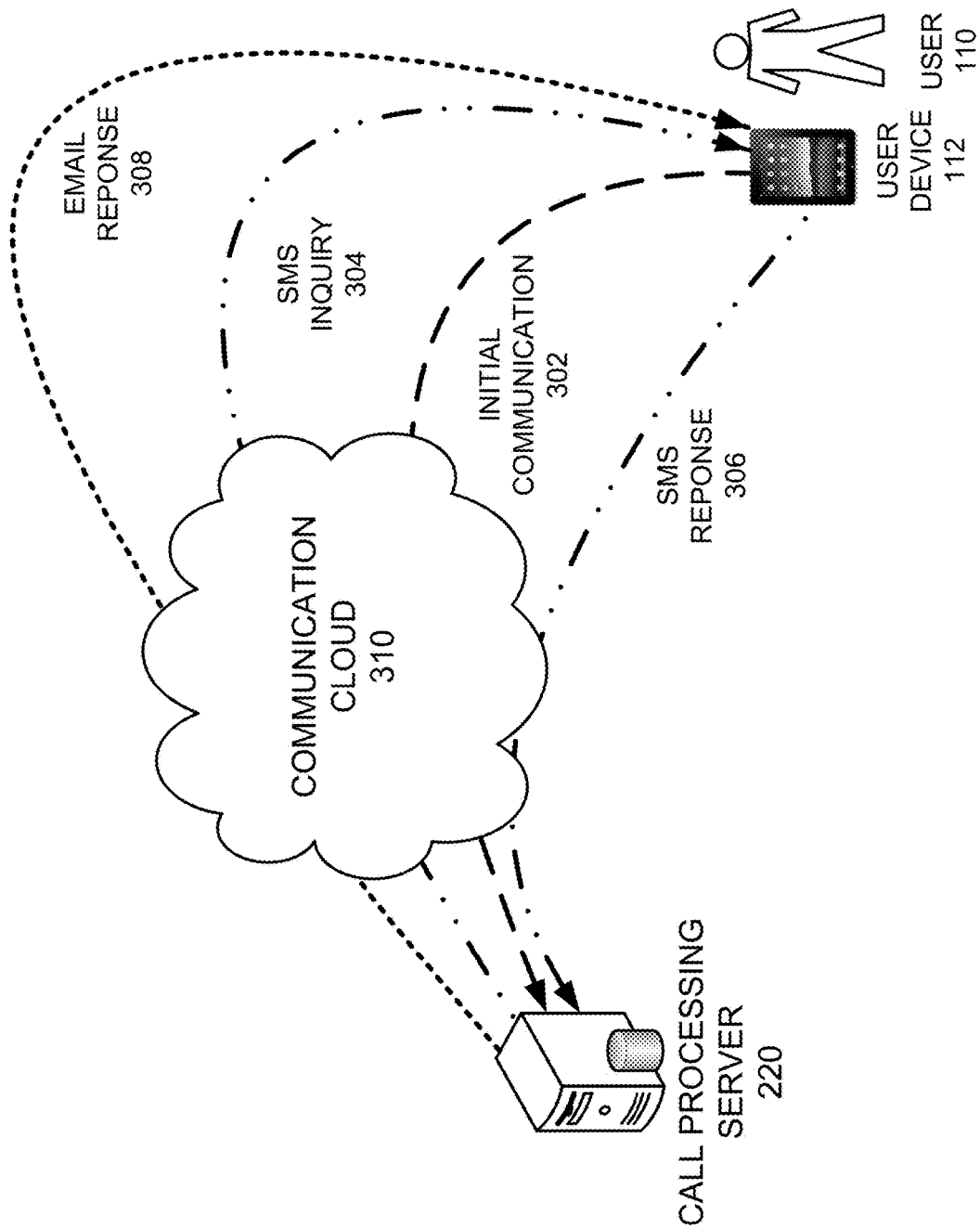
FIG. 3 illustrates a network diagram of a multi-mode network communication scenario according to example embodiments.

FIG. 3 illustrates a network diagram of a multi-mode network communication scenario according to example embodiments. Referring to FIG. 3, the network diagram 300 includes a call processing server 220 as the primary source of communication messaging. The user device 112 may communicate via a communication cloud that supports all the mobile device communication signaling mediums and protocols including but not limited to 3G/4G/LTE, SMS, PUSH mail, etc. The fundamental communication model may include an initial communication 302 and a SMS message response 304 responsive to receiving the call 302. The SMS message may be an inquiry for information, such as user concerns, purpose for the call, user information, etc. The SMS response 306 may provide content that is spoken and/or typed. The user device may make selections, purchases, access data, etc., and the information may be logged and a follow-up e-mail 308 may be sent to the user device 112 responsive to those selections.

Figure 4:
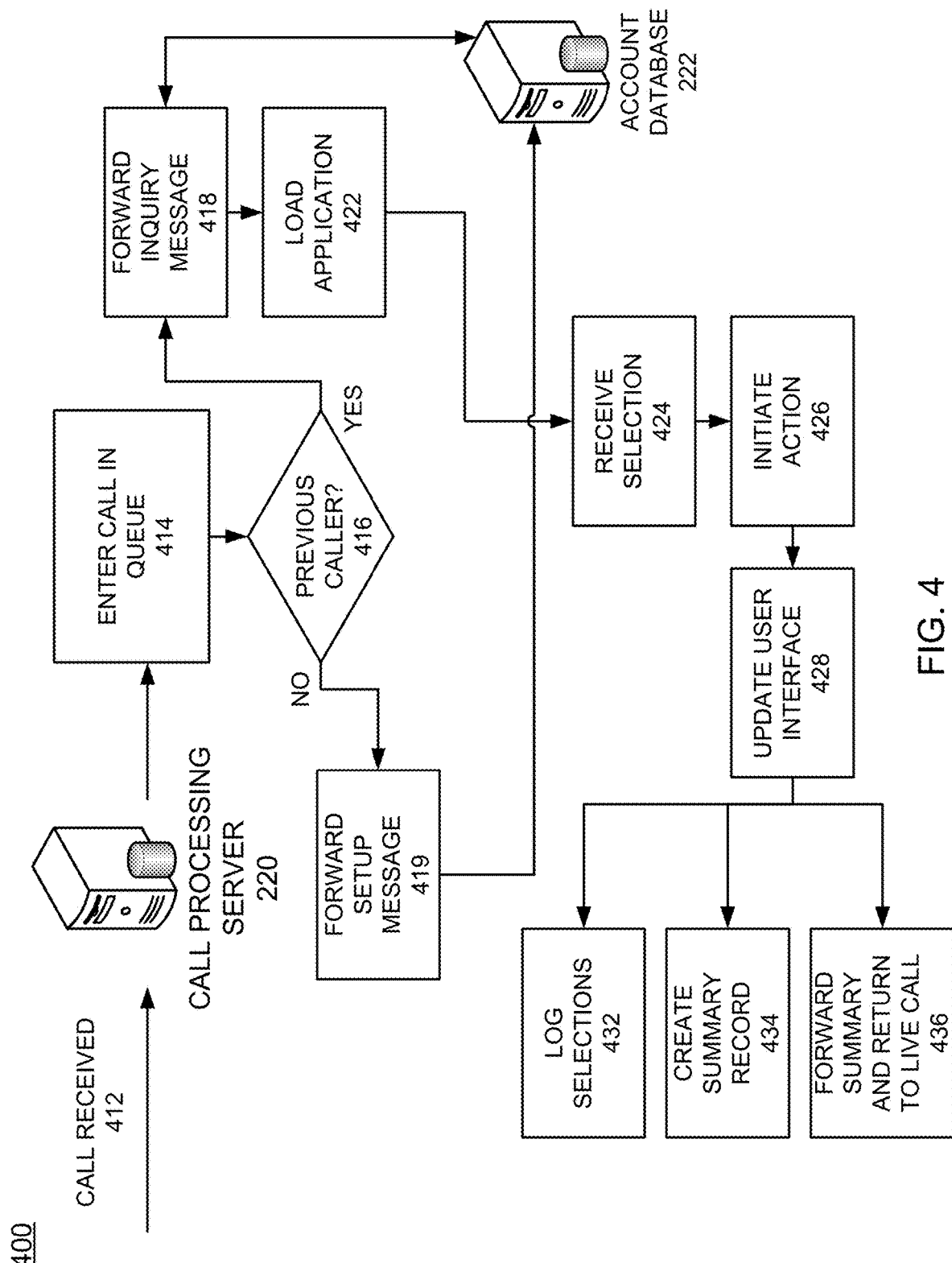
FIG. 4 illustrates a logic flow diagram and action diagram for processing a call and utilizing multi-mode communication options according to example embodiments of the present application.

FIG. 4 illustrates a logic flow diagram and action diagram for processing a communication and utilizing multi-mode communication options according to example embodiments of the present application. Referring to FIG. 4, the example logic flow diagram 400 may include a call or other communication being received 412 at the call processing server 220. The call may be assigned a placeholder or tag for a call queue of callers and entered in the queue 414. However, the call queue is an optional feature. The caller or call device is identified as either a known caller or a new caller 416. A previous communication identified from communication history of the user device associated with the communication may be retrieved to identify the user profile and previous reasons for calling and previous resolutions. Also, previous videos, links and other information forwarded to the user device may also be recorded along with any feedback, such as "helpful", "not helpful", etc. This enables the system to determine whether to not re-forward previously forwarded information and types of information the user confirmed were helpful. The new callers will receive a link via a SMS message to a call setup display application and/or web link. The user device may then populate the display and a completed setup display may be forwarded 419 signing up a new user back to the call processing server 220. An account database 222 may be updated to reflect changes or updates to the user account and/or profile.

In the event that the user device belongs to a returning user, the user's intent may be derived from a SMS response message response to an inquiry 418, which is another optional feature. Next, the application is loaded 422 and the information can be provided to the user or retrieved from the user or both. The user device may be forwarded to an IVR service, or the communication can be multi-modal where a text with links are provided, etc. When the application is loaded 422, the user information, tips, advice, content, advertisements, call progress, etc., may all be selected and used to populate the application on the user's mobile device. A selection may be received 424 and an action may be initiated 426 based on the user selection, such as providing content or information by updating the user interface 428 with retrieved content. Many actions may be performed on the user device and each selection during the active call may be logged and added to the log selections 432 of a summary record 434 which is then stored and forwarded to the mobile device as a summary e-mail or SMS message 436. The matured call or active call may be moved to a live agent, which will automatically terminate the application session and log the user activity until such a time. Assuming the user is operating a cable box, the content agent may forward content to a user set top box which receives the information (i.e., video, audio, etc.).

Figure 5A:
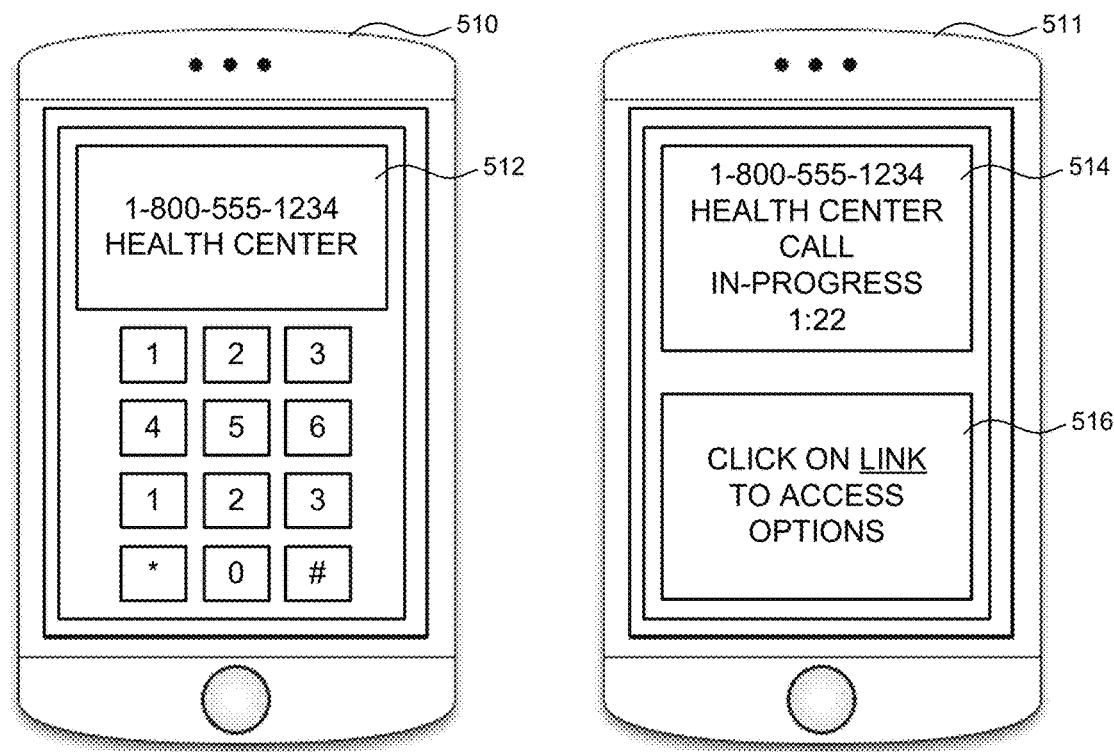
FIG. 5A illustrates a customer device user interface populated with call center information according to example embodiments of the present application.

FIG. 5A illustrates a customer device user interface populated with information according to example embodiments of the present application. Referring to FIG. 5A, the user interfaces 500 includes two user device interface examples. The first example of the user device 510 includes a simple call display with the user dialing a number 512. The second display 511 illustrates the split-screen interface 514 and 516 with the call in progress illustrating the active call and the second display illustrating an access link 516 which was activated by an application responsive to the user dialing the call or is the result of a SMS message being received and the link being illustrated in the second sub-display 516.

Figure 5B:
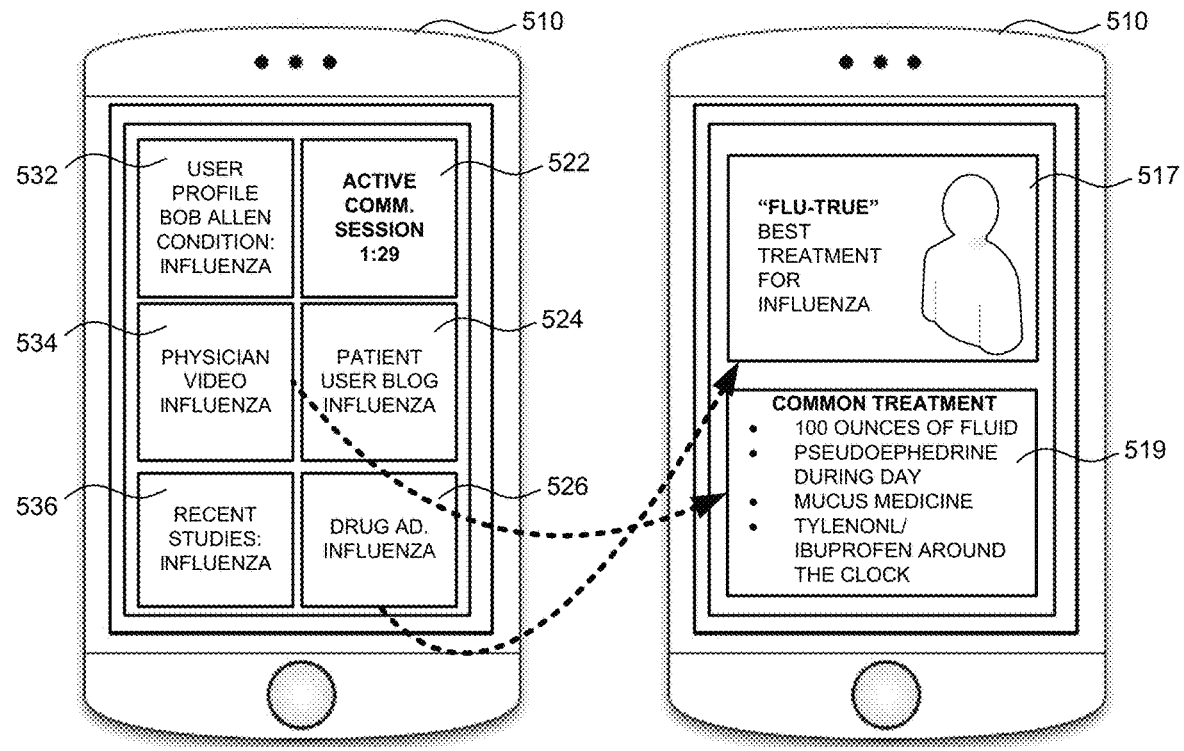
FIG. 5B illustrates another customer device user interface populated with call center display options during a live call according to example embodiments of the present application.

FIG. 5B illustrates another customer device user interface populated with options during a live call according to example embodiments of the present application. Referring to FIG. 5B, the user interfaces 550 include examples of multiple options being presented to a user application during a live call. In this example, the customer call is received, the customer is identified, and used to determine user reasons for calling. The multi-modal (MM) communication scheme permits sending and receiving of SMS, e-mail, chat, calls, etc., to include voice, video, audio, text or links to such information while awaiting a transfer to a live agent. For instance, in this example the user has submitted a response message indicating that influenza symptoms are being experienced. The term "flu" or "bad cold" may be identified and used to trigger an influenza topic of interest. This may in turn cause a series of topic areas to populate the user interface. For example, the user's profile may be summarized in one corner 532 to include user information and condition information. The call status 522 may also be present to remind the caller of the current status. The customer's assigned physician may have preferential content applied to the remainder of the display. For example, the physician assigned to the customer may have a pre-recorded video or audio 534 that can be played to educate the user about the condition and the remedies. Also, recent studies 536, current patient blogs 524 and drug advertisements 526 can be identified and populated in the user display for the topic of interest. The data display options can be populated based on an identified user topic of interest or concern. The display links can then be populated once a focal topic is identified. The user may then access the advertisement 526 for a particular influenza drug 517 and the physician content 519. The drug may have a banner advertisement or video content to share and the physician video may have a list of treatment options to educate the user before the call is received.

Figure 6:
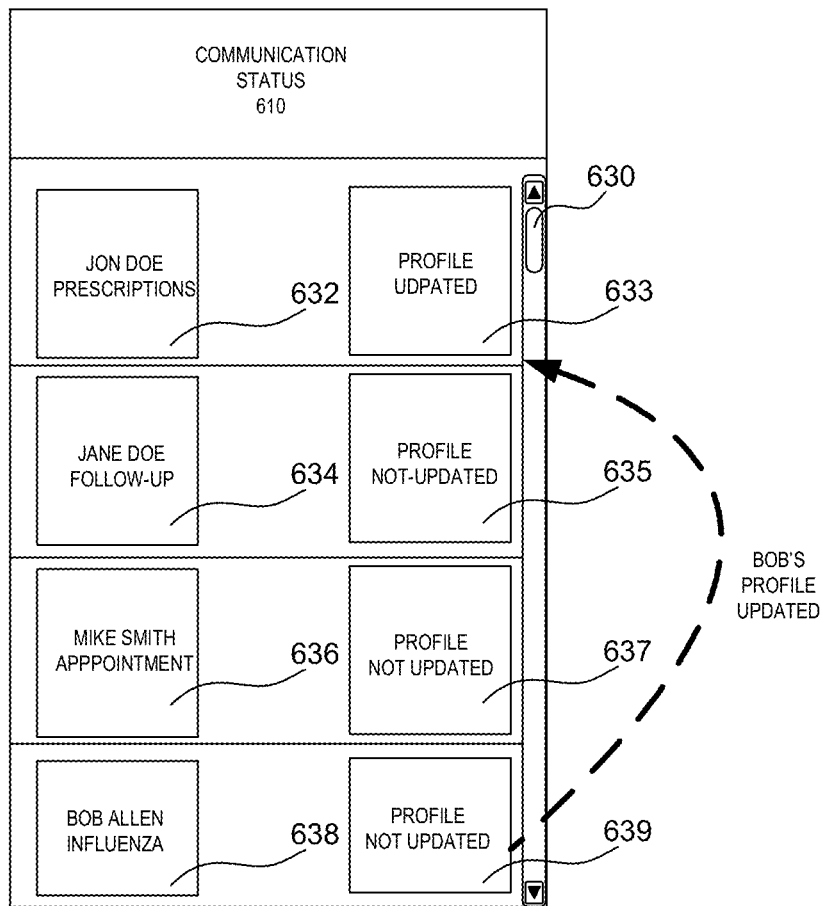
FIG. 6 illustrates a communication status for customer request services during an active call according to example embodiments of the present application.

FIG. 6 illustrates a communication status for customer request services during an active call according to example embodiments of the present application. Referring to FIG. 6, the communication status configuration 600 includes a set 610 of recent callers. The callers may have a name identifier, reason for calling 'prescriptions', etc., and a profile status (i.e., helped, not helped, sent information, not yet assisted, etc.). The scroll bar 630 provides access to the active callers 632-638 with their corresponding statuses 633-639. In this example, the profile not updated 639 status of Bob Allen may be updated per a SMS message with a profile update link. The user may access the link, update the profile and the active call will elevate in its status and/or priority based on the updated profile status. The update may elevate the status over other caller's who have not updated their information.

Figure 7A:
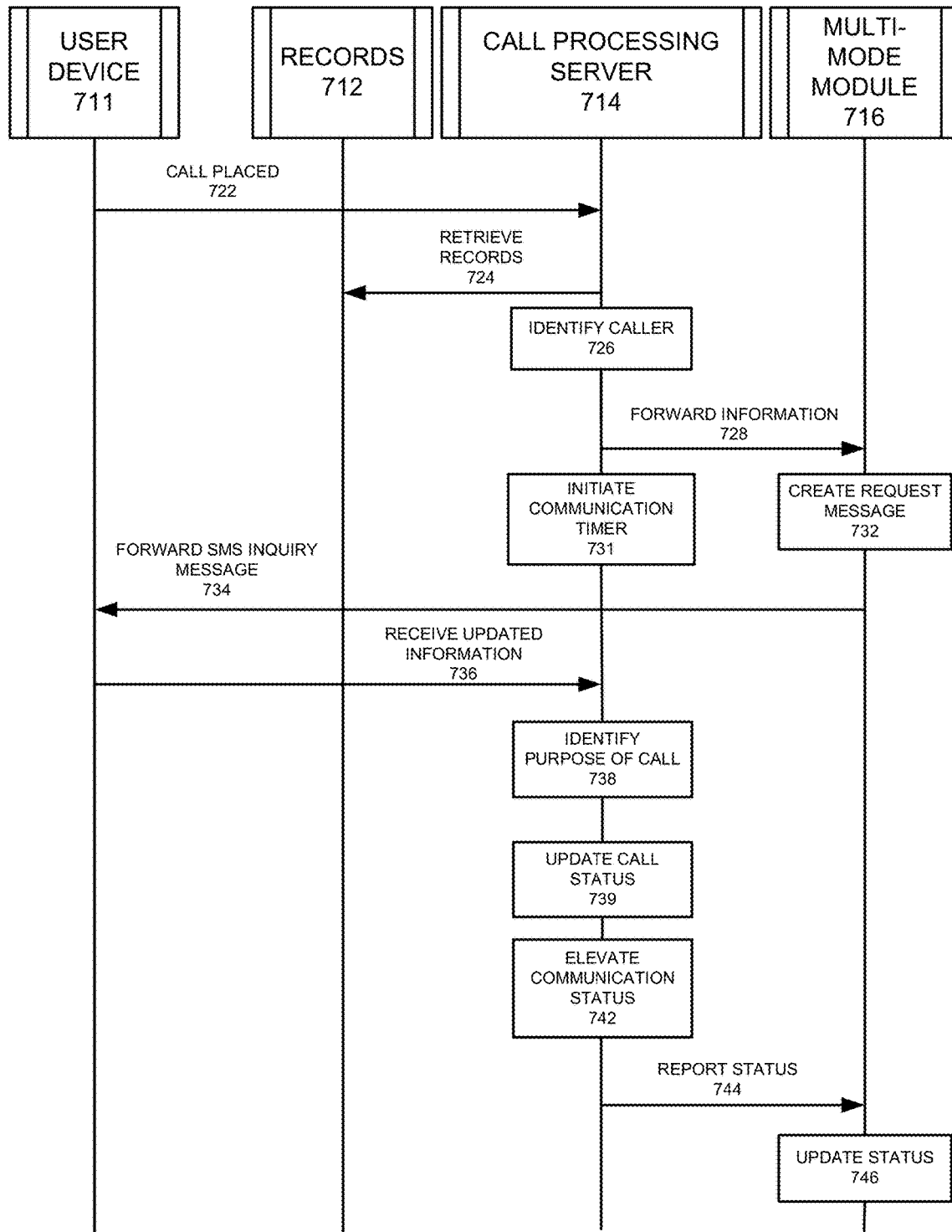
FIG. 7A illustrates a system signaling diagram for processing a customer call with multi-mode communication options according to example embodiments of the present application.

FIG. 7A illustrates a system signaling diagram for processing a customer call with multi-mode communication options according to example embodiments of the present application. Referring to FIG. 7A, the system diagram 700 includes a user device 711 as a user or customer attempting to call and access assistance at a medical treatment center. The caller may be trying to obtain an appointment, a prescription, advice, a follow-up, etc. The call may be received via a call processing sever 714 which then identifies the caller and obtains a caller record or profile 712 to identify the caller in greater detail. The call is placed 722 and the records are retrieved 724 to identify the caller 726. 712-716 can be the same module and messages can be sent outside of the network. The multi-mode module 716 is responsible for generating and forwarding a SMS message 732 to request additional information or forward the caller to a display or web link for additional information 734 such as a message with a link. There may be multiple messages with call control, a voice channel that is active for interacting with the customer while the messages, etc., are sent with the links. The received call may be identified via a communication timer 731 which identifies the live status and forwarded to a live agent and a timer may be used to track the caller's active call status.

The user device 711 may respond with update information 736. The server 714 can then identify the purpose of the call. The call may be received via a first communication medium and designated as an active call status. The purpose of the call is clarified and identified 738 and the call status is updated based on the call purpose. The position can be elevated responsive to identifying the call purpose 742. For example, the updated information, purpose of the call, etc., may be used to elevate the call status. The status 744 can be shared with the multi-mode module 716 and the status can be updated accordingly 746.

Responsive to receiving the call, an authorization message may be generated and transmitted to the customer device via a second communication medium, such as SMS. An authorization response message may be sent to the server 714 which includes answers to questions or information that authorizes the customer account. The received information can be used to elevate the call status. In another example, responsive to receiving the call, an inquiry message can be created and sent to the customer device. The inquiry response message can be received and parsed to determine the call purpose based on the parsed inquiry response message, and elevated in status responsive to determining the call purpose. Additionally, an application on the user device may be initiated responsive to receiving the inquiry response message. A display on the application can be populated with a plurality of display options related to the inquiry response message.

The user may have user preferences which are predefined and can be retrieved from the customer record and applied to the display options. During the initial authorization period, the customer device can be identified as a new customer. A registration web link can be created and sent as a SMS message to the customer device. The customer may access the SMS message and complete the registration from the customer device during the active call, and the call can be elevated in status responsive to receiving the completed registration.

Figure 7B:
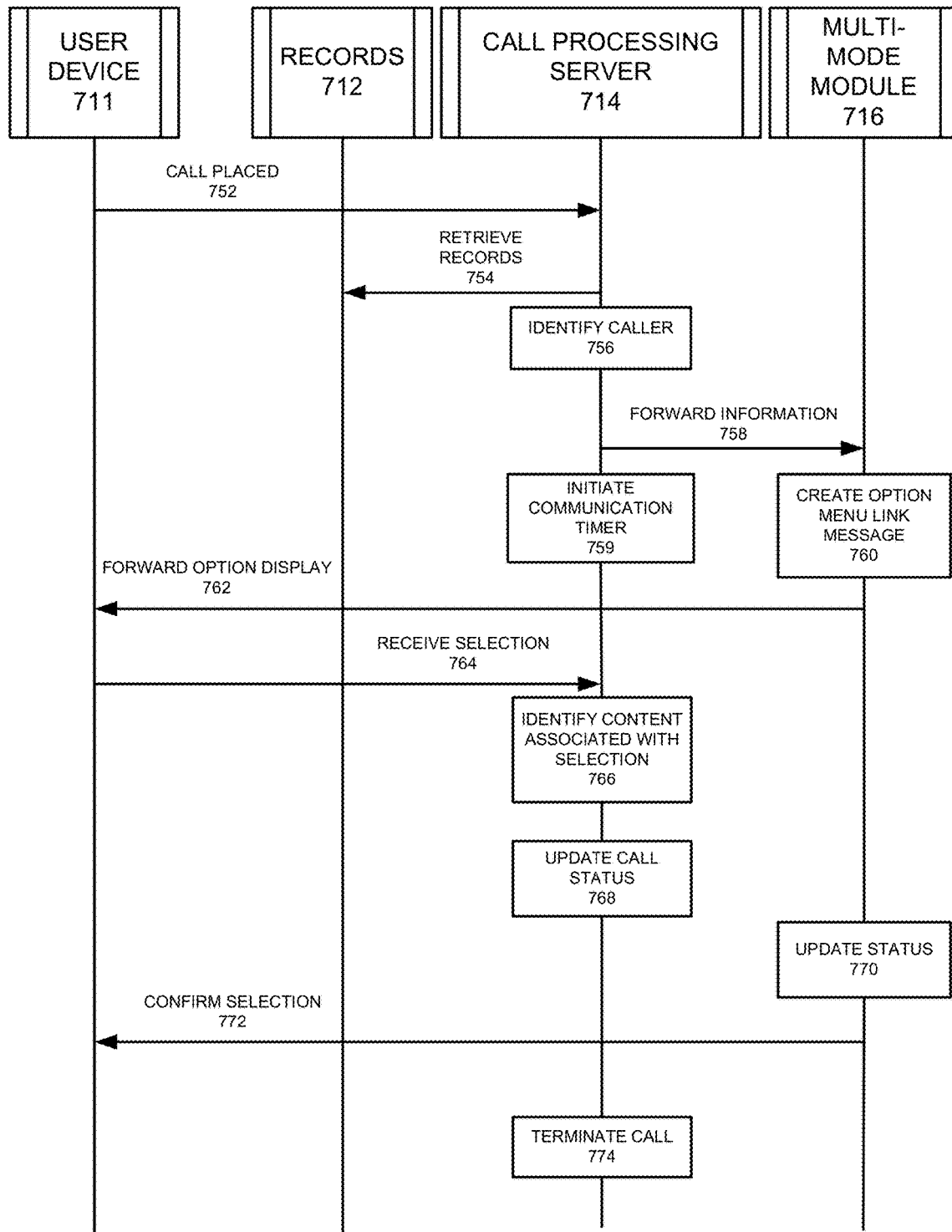
FIG. 7B illustrates a system signaling diagram for processing a customer call with multi-mode communication options according to example embodiments of the present application.

FIG. 7B illustrates a system signaling diagram for processing a customer call with multi-mode communication options according to example embodiments of the present application. Referring to FIG. 7B, the system diagram 750 includes a user device 711 as a user or customer attempting to call and access assistance at a medical treatment center. The caller may be trying to obtain an appointment, a prescription, advice, a follow-up, etc. The call may be received via a call processing sever 714 which then identifies the caller and obtains a caller record or profile 712 to identify the caller in greater detail. The call is placed 752 and the records are retrieved 754 to identify the caller 756. The caller information 758 may be forwarded to the multi-mode module 716. The multi-mode module 716 is responsible for generating and forwarding a SMS message display link message 760 to request additional information or forward the caller to a display or web link for additional information. The received communication may initiate a timer 759 to track the caller's active call status. The option display link is sent to the customer device via a second communication medium different from the first communication medium.

As a result, an option display selection from the customer device is received and an application can be initiated on the customer device, content is displayed on the customer device related to the at least one display selection. The display option 762 forwarded to the user is received and a selection is made 764. The call processing server 714 may then identify content that is associated with the selection 766. A call status 768 is updated base on the user selection and the status can be updated 770 to reflect user selections and an elevated status. The selection is confirmed 772 and the call is then terminated 774. Thereafter, a call is terminated responsive to the customer selection and the status is updated to reflect the changes to the communication status. The active status is then terminated responsive to receiving the call terminating selection. The call terminating selection includes at least one of a new appointment, a prescription refill and a physician confirmation.

During the display displaying period, the customer device may be notified that the active call has matured. The various selections, video, etc., accessed by the user may be logged along with the present status information of the content displayed on the customer device related to the at least one display selection. A message summary that includes the present status information can be created and transmitted to the customer device.

Figure 7C:
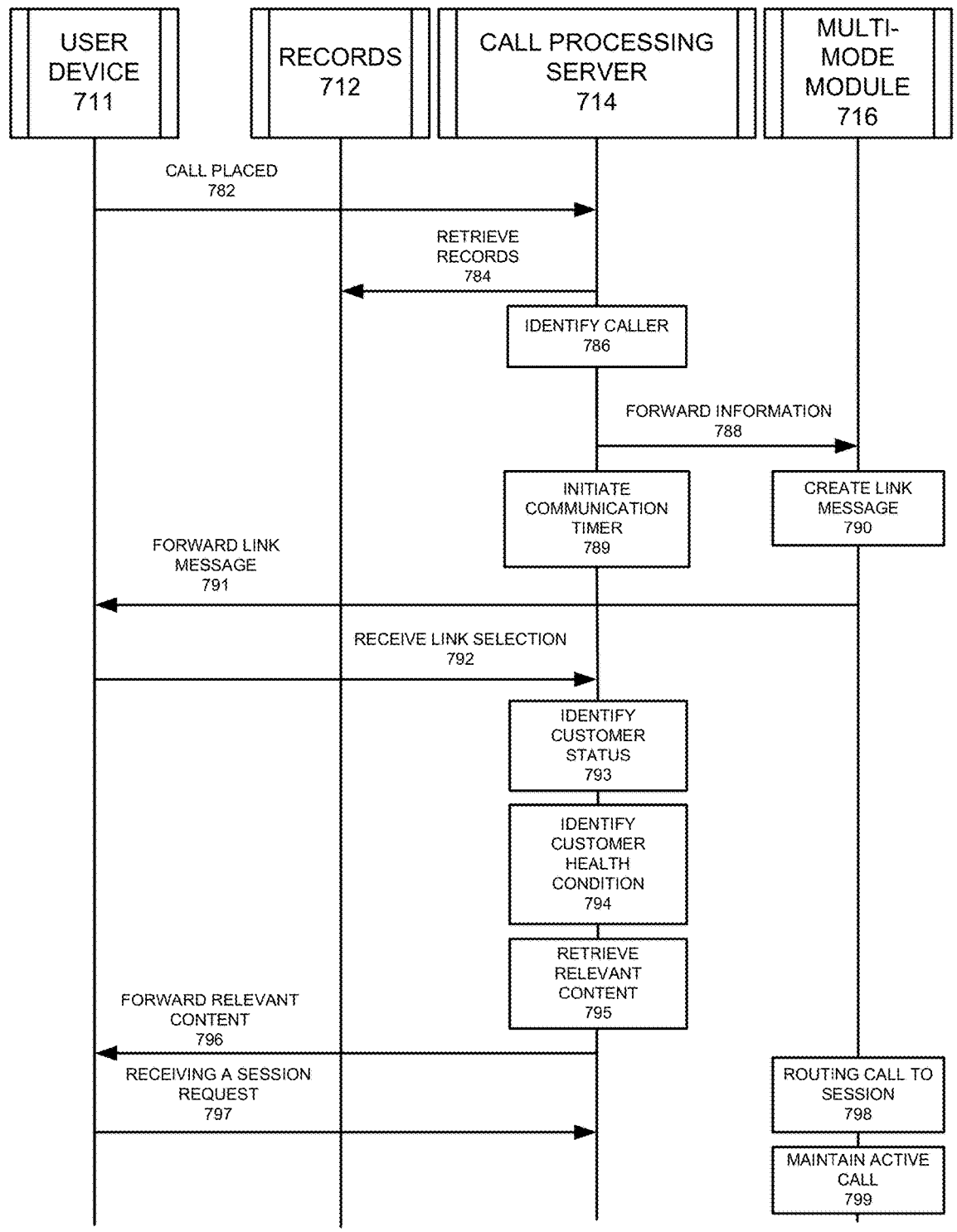
FIG. 7C illustrates a system signaling diagram for processing a customer call with multi-mode communication options according to example embodiments of the present application.

FIG. 7C illustrates a system signaling diagram for processing a customer call with multi-mode communication options according to example embodiments of the present application. Referring to FIG. 7C, the system diagram 780 includes a user device 711 as a user or customer attempting to call and access assistance at a medical treatment center. The caller may be trying to obtain an appointment, a prescription, advice, a follow-up, etc. The call may be received via a call processing sever 714 which then identifies the caller and obtains a caller record or profile 712 to identify the caller in greater detail. The call is placed 782 and the records are retrieved 784 to identify the caller 786. The information is forwarded 788 to the multi-mode module 716. The multi-mode module 716 is responsible for generating and forwarding a SMS message 790 to request additional information or forward the caller to a display or web link for additional information. The received communication may initiate an active status timer 789 used to track the caller's active call status.

During the initial customer call process, a customer record is retrieved and a current customer status inquiry is created and sent to the customer device. In response, a current customer status response is received and a current customer status is identified. Content related to the current customer status is retrieved and the content is forwarded to the customer device. The current customer status response is parsed to identify a current customer health condition. Also, an assigned physician may be identified from the customer record 712. The customer may be forwarded a link message 791 and a selection may be received 792 to identify a customer status 793 and health condition 794. At least one pre-recorded content file associated with the assigned physician and the current customer health condition can be retrieved 795 and forwarded 796 to the user device.

Among the display selection options forwarded to the user device, a list of the plurality of display option selections can be compiled responsive to the call being answered and a display option summary message can be created which include the list of display option selections. The display option summary message may be sent to the customer via a third communication medium different from the first communication medium and the second communication medium. Among the multi-mode communications, the first communication medium may be a telephone medium, the second communication medium may be a short message service medium and the third communication medium may be an electronic mail (e-mail) medium. The caller may receive an invitation to participate in a communication session related to a context of the current customer status and accept the invitation 797. The call may be routed 798 to the communication session and the active call may be maintained 799. An agent, optionally, may assist the user or the IVR options may also assist the user. A survey at the end of the communication can be sent via any of the various MMs mediums for receiving sensitive information or medical information. For example, an email can be sent with a link to the user which uploads information or medical images without the agent having access to such information.

When elevating a communication status or importance level, the customer device may initiate a communication which triggers a timer to being counting and an active status to begin. The time lapse may be a trigger that elevates the communication by crossing a threshold amount of time without agent feedback. The content sent to the user device during an active status may be viewed by the user device or ignored. If the content is reviewed the active status priority or communication status/importance level may be elevated again since the user is attempting to follow the information provided by the communication service and is rewarded by receiving agent access sooner.

Figure 8:
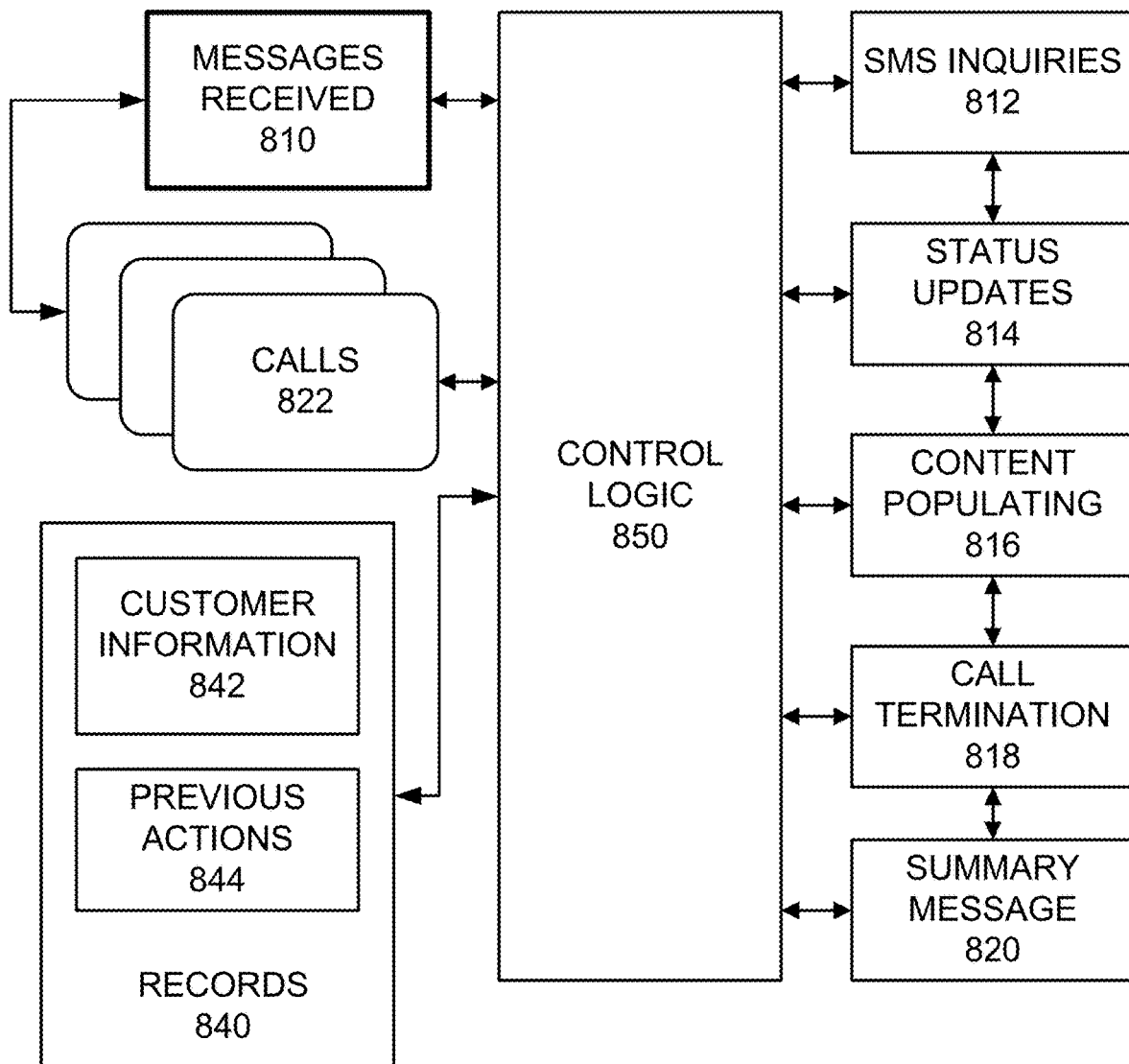
FIG. 8 illustrates a logic processing diagram according to example embodiments of the present application.

FIG. 8 illustrates a logic processing diagram according to example embodiments of the present application. Referring to FIG. 8, the processing logic 800 includes various inputs, such as messages received 810, responses to messages, etc., calls received 822 from various callers and record information 840 including customer information 842 and previous actions conducted by the customer 844. The control logic 850 may process the input information and output various output data including inquiry messages (i.e., email, SMS, etc.) 812 to obtain additional information, status updates 814 to reflect the changes to the customer status, content populating 816 to update the content of the customer displays on the customer device. Also, a call termination 818 and summary message 820 may result from customer actions performed during the active call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example network element 900, which may represent any of the above-described network components of the other figures.

Figure 9:
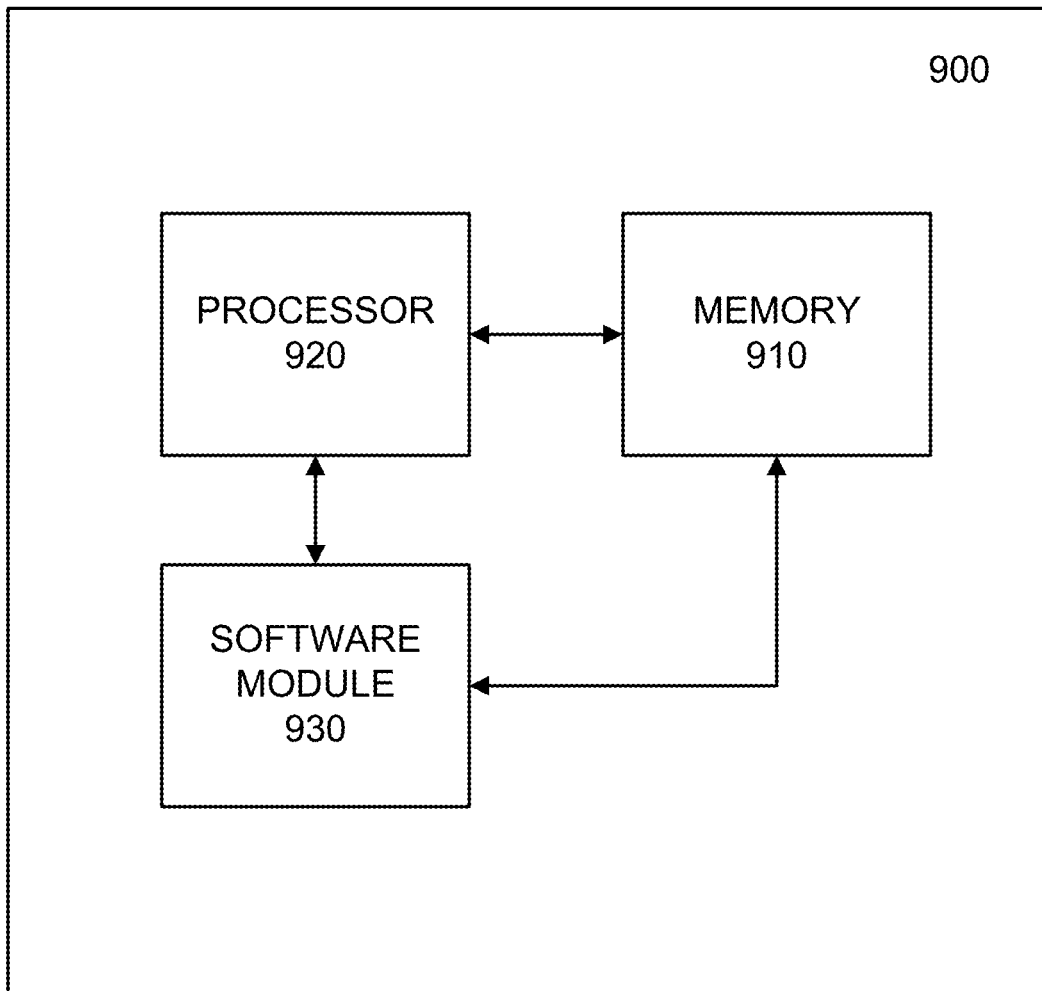
FIG. 9 illustrates an example network entity device configured to store instructions, software, and corresponding hardware for executing the same, according to example embodiments of the present application.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving, via one or more server devices, a communication from a customer device via a first communication medium;
   designating, via the one or more server devices, the communication as an active communication;
   forwarding, via the one or more server devices, a link message to the customer device that provides to a customer a display selection shown on the customer device;
   receiving, via the one or more server devices, a customer selection, from the display selection, to receive content during the active communication status; and
   identifying, via the one or more server devices, a current customer status based on the customer selection;
   identifying, via the one or more server devices, an agent assigned to a customer record of the customer;
   retrieving, via the one or more server devices, at least one pre-recorded content file associated with the identified agent and the current customer condition;
   forwarding, via the one or more server devices, the pre-recorded content file to the customer device via a second communication medium different from the first communication medium;
   identifying, via the one or more server devices, that pre-recorded content in the pre-recorded content file has been viewed by the customer; and
   in response to the identifying that the pre-recorded content has been viewed by the customer, reducing, via the one or more server devices, a time period until the customer is transferred to the identified agent.

2. The method of claim 1, further comprising:
   retrieving a customer record;
   transmitting a current customer status inquiry;
   receiving a current customer status response;
   identifying a current customer status;
   retrieving content related to the current customer status; and
   forwarding the content to the customer device.

3. The method of claim 2, further comprising:
   parsing the current customer status response to identify a current customer health condition;
   identifying an assigned physician from the customer record; and
   retrieving at least one pre-recorded content file associated with the assigned physician and the current customer health condition.

4. The method of claim 1, further comprising:
   receiving a plurality of display option selections during the active communication;
   storing the plurality of display option selections in memory;
   compiling a list of the plurality of display option selections responsive to the communication being answered;
   creating a display option summary message comprising the list of display option selections; and
   transmitting the display option summary message via a third communication medium different from the first communication medium and the second communication medium.

5. The method of claim 4, wherein the first communication medium is a telephone medium, the second communication medium is a short message service medium and the third communication medium is an electronic mail (e-mail) medium.

6. The method of claim 1, further comprising:
   routing the communication to the communication session and maintaining the active communication.

7. The method of claim 6, further comprising:
   creating a display option summary message comprising a record of the communication session; and
   transmitting the display option summary message to the customer device via a third communication medium different from the first communication medium and the second communication medium.

8. An apparatus, comprising:
   a processor configured to:
     designate a communication received from a customer device as an active communication;
     designate a current customer status of a customer associated with the customer device;
     identify an agent assigned to a customer record of the customer;

retrieve at least one pre-recorded content file associated with the identified agent and the current customer condition;
transmit the pre-recorded content file to the customer device via a second communication medium different from the first communication medium;
identify that pre-recorded content in the pre-recorded content file has been viewed by the customer; and
in response to the identification that the pre-recorded content has been viewed by the customer, reduce a time period until the customer is transferred to the identified agent.

9. The apparatus of claim 8, wherein the processor is further configured to:
retrieve a customer record;
transmit a current customer status inquiry;
receive a current customer status response;
identify a current customer status; retrieve content related to the current customer status; and
transmit the content to the customer device.

10. The apparatus of claim 9, wherein the processor is further configured to:
parse the current customer status response to identify a current customer health condition;
identify an assigned physician from the customer record; and
retrieve at least one pre-recorded content file associated with the assigned physician and the current customer health condition.

11. The apparatus of claim 8, wherein the processor is further configured to:
receive a plurality of display option selections during the active communication;
store the plurality of display option selections in memory;
compile a list of the plurality of display option selections responsive to the communication being answered;
create a display option summary message comprising the list of display option selections; and
transmit the display option summary message via a third communication medium different from the first communication medium and the second communication medium.

12. The apparatus of claim 11, wherein the first communication medium is a telephone medium, the second communication medium is a short message service medium and the third communication medium is an electronic mail (e-mail) medium.

13. The apparatus of claim 9, wherein the processor is further configured to:
transmit an invitation to participate in a communication session related to a context of the current customer status;
receive an acceptance to the invitation; and
route the communication to the communication session and maintaining the active communication.

14. The apparatus of claim 13, wherein the processor is further configured to:
create a display option summary message comprising a record of the communication session; and
transmit the display option summary message to the customer device via a third communication medium different from the first communication medium and the second communication medium.

15. A non-transitory computer readable storage medium configured to store at least one instruction that when executed by a processor causes the processor to perform:
receiving a communication from a customer device via a first communication medium;
designating the communication as an active communication;
receiving a display selection to receive content during the active communication status and designating a current customer status of a customer associated with the customer device;
identifying an agent associated to a customer record of to the customer record based on the current condition;
retrieving at least one pre-recorded content file associated with the identified agent and the current customer condition;
forwarding the pre-recorded content file to the customer device via a second communication medium different from the first communication medium;
identifying that pre-recorded content in the pre-recorded content file has been viewed by the customer to; and
in response to the identifying that the pre-recorded content has been viewed by the customer, reducing a time period until the customer is transferred to the identified agent.

16. The non-transitory computer readable storage medium of claim 15, further configured to store at least one instruction that when executed by the processor causes the processor to perform:
retrieving a customer record;
transmitting a current customer status inquiry;
receiving a current customer status response;
identifying a current customer status;
retrieving content related to the current customer status; and
forwarding the content to the customer device.

17. The non-transitory computer readable storage medium of claim 16, further configured to store at least one instruction that when executed by the processor causes the processor to perform:
parsing the current customer status response to identify a current customer health condition;
identifying an assigned physician from the customer record; and
retrieving at least one pre-recorded content file associated with the assigned physician and the current customer health condition.

18. The non-transitory computer readable storage medium of claim 15, further configured to store at least one instruction that when executed by the processor causes the processor to perform:
receiving a plurality of display option selections during the active communication;
storing the plurality of display option selections in memory;
compiling a list of the plurality of display option selections responsive to the communication being answered;
creating a display option summary message comprising the list of display option selections; and
transmitting the display option summary message via a third communication medium different from the first communication medium and the second communication medium.

19. The non-transitory computer readable storage medium of claim 18, wherein the first communication medium is a telephone medium, the second communication medium is a short message service medium and the third communication medium is an electronic mail (e-mail) medium.

20. The non-transitory computer readable storage medium of claim 16, further configured to store at least one instruction that when executed by the processor causes the processor to perform:
- transmitting an invitation to participate in a communication session related to a context of the current customer status;
- receiving an acceptance to the invitation;
- routing the communication to the communication session and maintaining the active communication;
- creating a display option summary message comprising a record of the communication session; and
- transmitting the display option summary message to the customer device via a third communication medium different from the first communication medium and the second communication medium.

\* \* \* \* \*